(12) United States Patent
Wen et al.

(10) Patent No.: US 10,771,735 B2
(45) Date of Patent: Sep. 8, 2020

(54) DATA CABLE, ELECTRONIC SYSTEM AND METHOD FOR TRANSMITTING MIPI SIGNAL

(71) Applicant: MEDIATEK SINGAPORE PTE. LTD., Singapore (SG)

(72) Inventors: Yuan Wen, Singapore (SG); Jian Xiong, Singapore (SG)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/871,121

(22) Filed: Jan. 15, 2018

(65) Prior Publication Data

US 2019/0007647 A1 Jan. 3, 2019

(30) Foreign Application Priority Data

Jun. 28, 2017 (CN) .......................... 2017 1 0510045

(51) Int. Cl.
*G06F 13/38* (2006.01)
*H04N 7/10* (2006.01)
*H04N 7/015* (2006.01)

(52) U.S. Cl.
CPC ............ *H04N 7/102* (2013.01); *H04N 7/015* (2013.01)

(58) Field of Classification Search
None
See application file for complete search history.

(56) References Cited

U.S. PATENT DOCUMENTS

| 2003/0018823 | A1* | 1/2003 | Ponticelli | G06F 13/4291 |
| | | | | 709/253 |
| 2009/0011643 | A1* | 1/2009 | Amleshi | H01R 13/514 |
| | | | | 439/607.05 |
| 2013/0191563 | A1* | 7/2013 | Toba | H04N 5/775 |
| | | | | 710/62 |
| 2013/0194005 | A1 | 8/2013 | Voutilainen et al. | |
| 2015/0113196 | A1 | 4/2015 | Ebert | |
| 2015/0326277 | A1* | 11/2015 | Huang | H04B 15/02 |
| | | | | 375/230 |
| 2016/0192360 | A1 | 6/2016 | Lee et al. | |
| 2017/0353590 | A1* | 12/2017 | Shen | G01R 31/02 |
| 2018/0275713 | A1* | 9/2018 | Srivastava | G06F 1/06 |

FOREIGN PATENT DOCUMENTS

| CN | 101847134 A | 9/2010 |
| CN | 104735387 A | 6/2015 |

OTHER PUBLICATIONS

AN 754: MIPI D-PHY Solution with Passive Resistor Networks in Intel Low-Cost FPGAs, May 8, 2017, Intel (Year: 2017).*

* cited by examiner

*Primary Examiner* — Hyun Nam

(57) ABSTRACT

A data cable, electronic system and method for transmitting MIPI signals are provided. The electronic system includes a first electronic device configured to generate at least one pair of MIPI (Mobile Industry Processor Interface) differential signals, and a data cable and a second electronic device connected to the first electronic device via the data cable. The data cable is configured to receive the at least one pair of MIPI differential signals from the first electronic device, and perform impedance matching and shielded grounding processing on the at least one pair of MIPI differential signals, and transmit the processed at least one pair of MIPI differential signals to the second electronic device.

16 Claims, 7 Drawing Sheets

US 10,771,735 B2

DATA CABLE, ELECTRONIC SYSTEM AND METHOD FOR TRANSMITTING MIPI SIGNAL

CROSS-REFERENCE TO RELATED APPLICATIONS

This application claims all benefits accruing under 35 U.S.C. § 119 from China Patent Application No. 201710510045.7, field on Jun. 28, 2017 in the China Intellectual Property Office, the contents of which are hereby incorporated by reference.

TECHNICAL FIELD

The present disclosure generally relates to signal transmission technologies, and in particular relates to a data cable, an electronic system and a method for transmitting Mobile Industry Processor Interface (MIPI) signal.

BACKGROUND

As shown in FIG. 1, the schematic view of an electronic system is depicted, comprising a camera 11, a High Definition Multimedia Interface (HDMI) data cable 12 and an electronic device 13.

The camera 11 includes an image sensor 111, an image processor 112 and an HDMI transmitter 113, which are in series. The image sensor 111 is used for obtaining image information, the image processor 112 is configured for processing the image information (which is in form of MIPI signals) as HDMI signals, and the HDMI transmitter 113 is used for transmitting the HDMI signals. One end of the HDMI cable 12 is connected to the HDMI transmitter 113, which is configured to acquire the HDMI signals from the HDMI transmitter 113 and transmit the HDMI signals to the electronic device 13 connected to the other end of the HDMI cable 12. The electronic device 13 includes a HDMI receiver 131 and a processor 132, which are in series. The HDMI receiver 131 is connected to the other end of the HDMI cable 12, which is used to acquire the HDMI signals from the HDMI cable 12. The processor is configured to convert the HDMI signals to image information.

In the aforementioned scheme, the camera 11 converts the image information to the HDMI signals through the image processor 112 thereof, and transmits the HDMI signals to the electronic device 13 through the HDMI cable. In this way, the camera 11 can have a long distance with the electronic device 12, such that the long distance transmission of the image information is achieved. However, as an image processor and a HDMI transmitter are needed to be added in the camera 11 in this scheme, the HDMI receiver 131 is accordingly added in the electronic device 13. Therefore, the cost of the electronic system is high.

SUMMARY

Embodiments of the present disclosure provide a data cable, an electronic system and a method for transmitting MIPI signals.

In accordance with a first aspect of the present application, an electronic system is provided, and the electronic system comprises: a first electronic device configured to generate at least one pair of MIPI differential signals; a data cable and a second electronic device connected to the first electronic device via the data cable; wherein the data cable is configured to receive the at least one pair of MIPI differential signals from the first electronic device, and perform impedance matching and shielded grounding processing on the at least one pair of MIPI differential signals, and transmit the processed at least one pair of MIPI differential signals to the second electronic device.

In accordance with a second aspect of the present application, a method for transmitting MIPI signal, the method comprises generating by a first electronic device at least one pair of MIPI differential signals; receiving by a data cable the at least one pair of MIPI differential signals, and performing impedance matching and shielded grounding processing on the at least one pair of MIPI differential signals; and transmitting by the data cable the at least one pair of MIPI differential signals to a second electronic device.

In accordance with a third aspect of the present application, a data cable is provided, the data cable is configured to transmit MIPI signals, comprising at least one data signal transmission path, wherein each of the at least one data signal transmission path is configured for transmitting one pair of MIPI differential signals and performing impedance matching and shielded grounding processing on the one pair of MIPI differential signals, and a length of the data cable is greater than or equal to 1 meter.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work. In the drawings.

DETAILED DESCRIPTION

The technical solution of the embodiments of the present disclosure will be described more clearly and completely with reference to the accompanying drawings. Apparently, the embodiments described here only some exemplary embodiments, not all the embodiments. Based on the embodiments described in the present disclosure, one skilled in the art may acquire all other embodiments without any creative work. All these shall be covered within the protection scope of the present disclosure.

Figure 2:
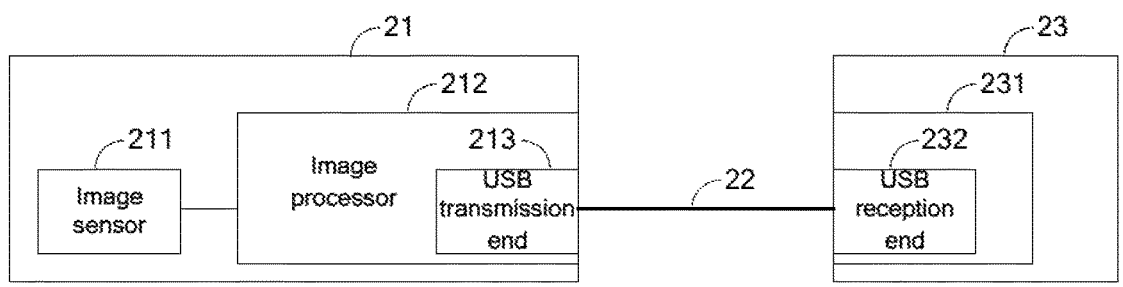
FIG. 2 is a schematic view illustrating an electronic system transmitted via a USB cable.

Referring to FIG. 2, which is a schematic view of an electronic system to transmit through a Universal Serial Bus (USB) cable, the electronic system may include a camera 21, a USB cable 22 and an electronic device 23. The camera 21 is connected to the electronic device 23 via the USB cable 22. The camera 21 may include an image sensor 211 and an image processor 212. The image sensor 211 may be configured to acquire image information. The image processor 212 may be configured to convert the image information to USB signals, and then transmit the USB signals to the USB cable 22 through a USB transmission end 213 integrated into the image processor 212. The USB cable 22 may transmit the USB signals to the electronic device 23. The electronic device 23 may include a processor 231. The processor 231 may receive the USB signals from the USB cable 22 through a USB reception end 232 integrated into the processor 231, and the processor 231 may convert the USB signals to image information. As the image processor 212 is required to be added into the camera 21, the cost of the electronic system becomes high. In addition, as the transmission rate of the USB cable 22 is low, compression processing is required to be performed on the signals, resulting in bad quality of the USB signals transmitted by the USB cable 22.

Figure 3:
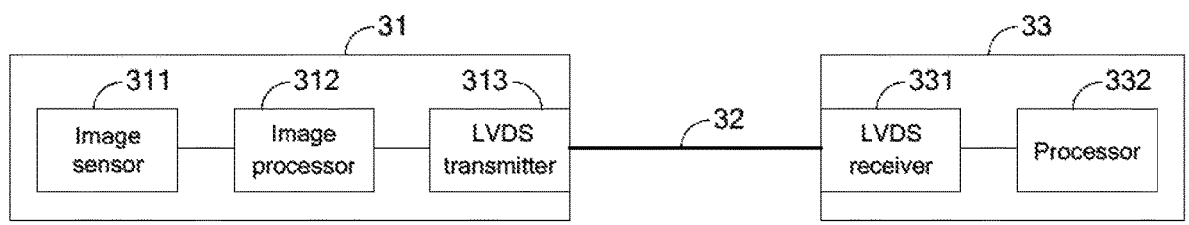
FIG. 3 is a schematic view illustrating an electronic system transmitted via a LVDS cable.

Referring to FIG. 3, which is a schematic view of an electronic system to transmit through a Low-Voltage Differential Signaling (LVDS) cable, the electronic system may include a camera 31, a LVDS cable 32 and an electronic device 33. The camera 31 is connected to the electronic device 33 via the LVDS cable 22. The camera 31 may include an image sensor 311, an image processor 312 and a LVDS transmitter 313. The image sensor 311 may be configured to acquire image information. The image processor 212 may be configured to convert the image information to LVDS signals, and then transmit them to the LVDS cable 32 through the LVDS transmitter 313. The LVDS cable 32 may transmit the LVDS signals to the electronic device 33. The electronic device 33 may include a LVDS receiver 331 and a processor 332, which are connected in series. The LVDS receiver 331 may be configured to receive the LVDS signals from the LVDS cable 32. The processor 332 may be configured to convert the LVDS signals to image information. As the image processor 312 and the LVDS transmitter 313 are required to be added into the camera 31, and the LVDS receiver 331 is required to be added into the electronic device 33, the cost of the electronic system is high.

Figure 4:
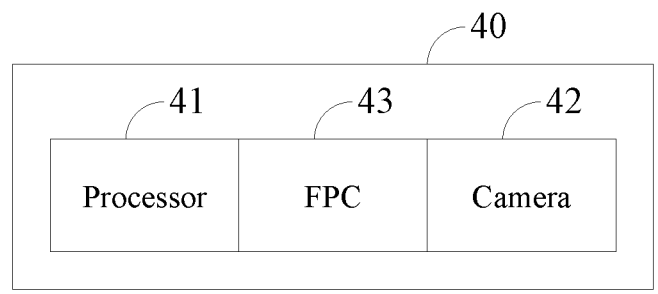
FIG. 4 is a schematic view illustrating an electronic device for transmitting MIPI signals.

FIG. 4 is a schematic view of an electronic device configured for transmitting MIPI signals. As is shown in FIG. 4, a processing module 41 and a camera module 42 are integrated into an electronic device 40. For instance, the electronic device 40 may be a smartphone. When arranging the physically layout of the electronic device 40, the distance between the processing module 41 and the camera module 42 is short, which is generally in a range of several centimeters. Thus a Flexible Printed Circuit (FPC) may be adopt to be arranged between the processing module 41 and the camera module 42 to transmit MIPI signals without converting them to other signals. However, the transmission distance of the MIPI signals should generally be less than 7 cm (which is common in the art). If the transmission distance of the MIPI signals exceeds 10 cm, the signal attenuation is too severe to meet the transmission requirements. As a result, the long distance transmission of MIPI signals will generally be avoided in the art. Therefore, the embodiment in FIG. 4 is only applied for a situation where the distance between the camera and the processor is in a range of some centimeters, and is unsuitable for a situation where the camera and the processor are far apart each other. For example, in the field of automotive vehicle, a host of an auto electronic equipment with a front camera externally connected to it will be used as a driving recorder or Advanced Driver Assistant Systems (ADAS). However the distance between the front camera and the host of the auto electronic equipment is generally more than 1 meter, and then the scheme in FIG. 4 will not be suitable for this situation.

Figure 1:
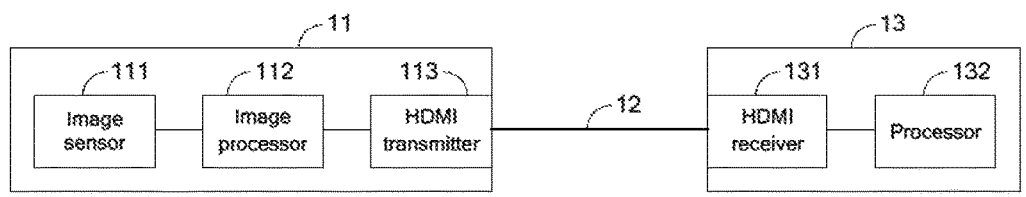
FIG. 1 is a schematic view illustrating an electronic system transmitted via a HDMI cable.

What can be seen from the schemes in FIGS. 1-3, since an image processor is required to be added into the camera, the cost of an electronic system becomes high. In addition, as the image information is adopt in form of the MIPI signals, the camera requires to convert the image information to HDMI signals, USB signals or LVDS signals to transmit. Then the processor of the electronic device will convert the HDMI signals, USB signals or LVDS signals to the image information. Thus the load of the processor is increased. As it can be seen from the scheme in FIG. 4, the transmission distance of the MIPI signals is less than 7 cm, thus long distance transmission cannot be supported.

Figure 5:
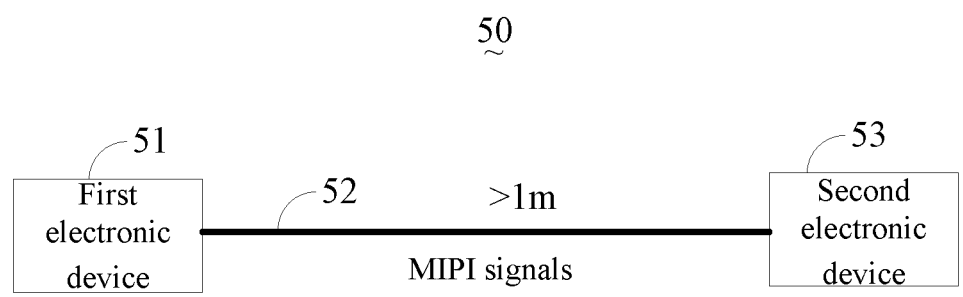
FIG. 5 is a schematic view illustrating an embodiment of an electronic system according to the present disclosure.

Referring to FIG. 5, which illustrates a schematic view of an embodiment of an electronic system according to the present disclosure, the electronic system 50 may include a first electronic device 51, a data cable 52 and a second electronic device 53. The first electronic device 51 is connected to the second electronic device 53 via the data cable 52. The data cable 52 is used for transmitting MIPI signals.

The first electronic device 51 may be configured for generating at least one of MIPI differential signals. The data cable 52 may receive the at least one of MIPI differential signals from the first electronic device 51, and perform impedance matching and shielded grounding processing on the at least one of MIPI differential signals. And then the data cable 52 may transmit the processed at least one of MIPI differential signals to the second electronic device 53.

Figure 6:
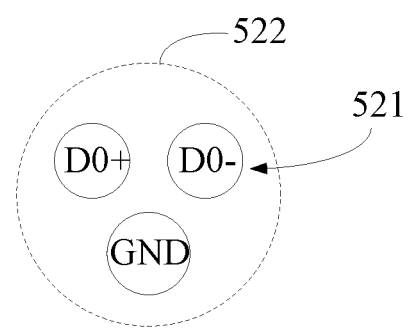
FIG. 6 is a schematic view illustrating a data cable in FIG. 5.

In specific, the data cable 52 is used for performing impedance matching on at least one of MIPI differential signals. That is to say, each MIPI differential signal of the at least one pair of MIPI differential signals has the same impedance when being transmitted through the data cable 52. The data cable 52 is further used for performing shielded grounding processing on the at least one pair of MIPI differential signals to avoid interference. As is shown in FIG. 6, which only depicts one pair of MIPI differential signals, namely differential signal D0+ and D0−, one transmission path 521 of the data cable 52 transmits the MIPI differential signal D0+, D0− and a ground signal GND. A shielding layer 522 is provided for shielding the transmission path 521 in the data cable 52. The shielding layer 522 may be aluminum foil for wrapping the transmission path 521.

Compared with the schemes in FIGS. 1-3, the data cable 52 in this embodiment receives at least one pair of MIPI differential signals from the first electronic device 51 and performs impedance matching and shielded grounding processing on the at least one pair of MIPI differential signals, and transmits the processed at least one pair of differential signals to the second electronic device 53. That is to say, the first electronic device 51 can transmit the at least one of MIPI differential signals to the second electronic device 53 via the data cable 52. In this way, a component for converting the MIPI signals to other signals (such as HDMI signals or LVDS signals) isn't required to be provided in the first electronic device 51, and a component for receiving the other signals isn't required to be provided in the second electronic device 52. Therefore, the cost of the electronic system 50 in this embodiment can be reduced. In addition, the second electronic device 53 can perform image processing on the at least one of MIPI differential signals, such that the load of the second electronic device 53 can be reduced. Moreover, compared with the scheme in FIG. 4, the data cable 52 in this embodiment performs impedance matching and shielded grounding processing on the at least one pair of MIPI differential signals such that the long distance transmission of the at least one pair of MIPI differential signals is achieved, overcoming the problem that long distance transmission isn't supported for MIPI signals. For instance, the length of the data cable 52 is greater than 1 meter.

Figure 7:
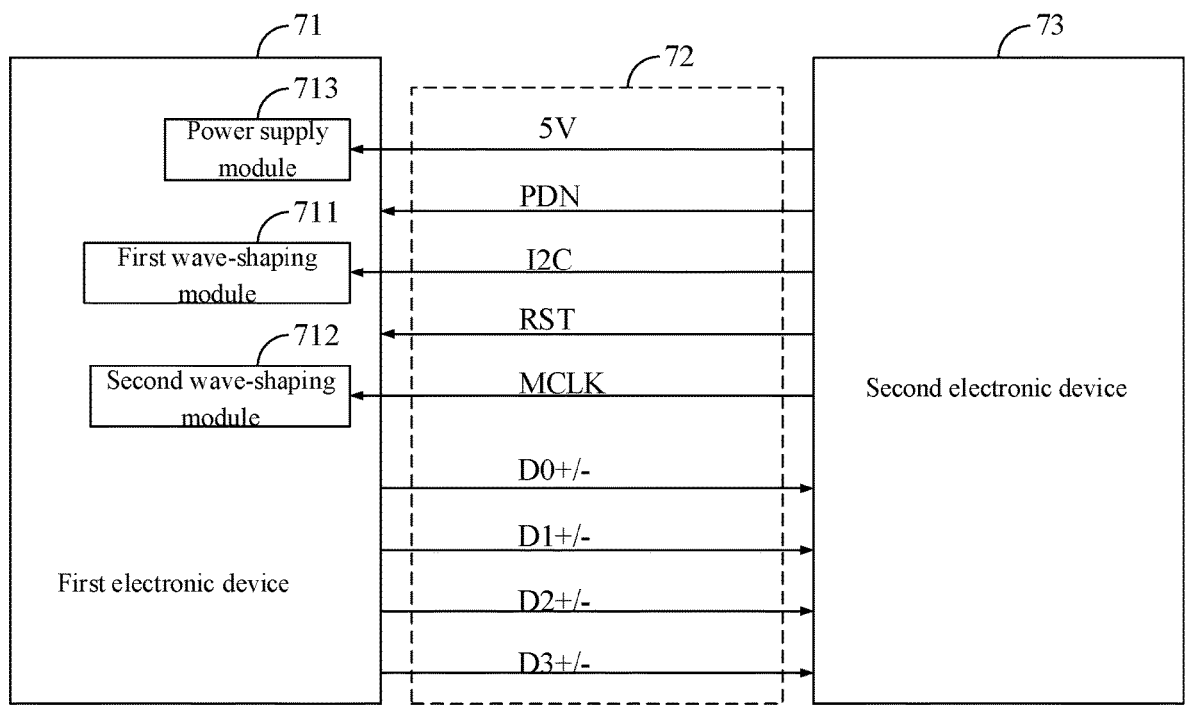
FIG. 7 is a schematic view illustrating another embodiment of an electronic system according to the present disclosure.

Another embodiment of an electronic system is provided in the present disclosure, which will be described as follows on the basis of the above mentioned electronic system 50. As is shown in FIG. 7, The data cable 72 further receives an indication signal from the second electronic device 73, such as an I2C (Inter Integrated Circuit) signal, and transmits the indication signal to the first electronic device 71. The indication signal is used to indicate how many pairs of MIPI differential signals adopted by the first electronic device 71 to perform data transmission. In the embodiment of FIG. 7, the data cable 72 supports up to four pairs of MIPI differential signals, then the I2C signal may indicate that the first electronic device 71 can use one, two, three or four pairs of MIPI differential signals for data transmission. For example, when the I2C signal indicates that two pairs of MIPI differential signals are used for data transmission, MIPI differential signals D0+/− and D1+/− may be adopted for data transmission.

A first wave-shaping module 711 is provided in the first electronic device 71. The first wave-shaping module 711 is configured for performing wave adjustment on the I2C signal received from the data cable 72, to reduce the loss generated when the data cable 72 transmits the I2C signal. The first wave-shaping module 711 is used to filter the I2C signal to adjust waves of the I2C signal.

The data cable 72 further receives a master clock (MCLK) signal from the second electronic device 73 and transmits the MCLK signal to the first electronic device 71. A second wave-shaping module 712 is provided in the first electronic device 71. The second wave-shaping module 712 is used for performing wave adjustment on the MCLK signal received from the data cable 72, so as to reduce the loss generated when the data cable 72 transmits the MCLK signal.

The first electronic device 71 determines whether the I2C signal and MCLK signal are delayed after receiving the I2C signal and MCLK signal. The first electronic device 71 tunes timings of the I2C signal and MCLK signal when the I2C signal and MCLK signal are delayed, avoiding delay resulting from long distance transmission of the I2C signal and MCLK signal via the data cable 72.

The data cable 72 further transmits power supply provided by the second electronic device 73 to a power supply module 713 of the first electronic device 71. The power supply module 713 is used for converting the power supply into a working voltage of the first electronic device 71. The power supply provided by the second electronic device 73 may be 5V power. The working voltage of the first electronic device 71 may be 1.2V, 1.8V or 2.8V. As the power supply provided by the second electronic device 73 is performed long distance transmission via the data cable 72, losses may be produced with the power supply provided by the second electronic device 73, probably resulting in a normal working failure of the first electronic device 71. Therefore, the power supply module 713 is provided in the first electronic device 71. The power supply module 713 is used for converting the power supply provided by the second electronic device 73 into a working voltage of the first electronic device 71, so as to ensure that the first electronic device 71 can work normally.

Both the first electronic device 71 and second electronic device 73 may perform impedance matching and shielded grounding processing on the at least one pair of MIPI differential signals. In other words, the first electronic device 71 performs impedance matching and shielded grounding processing on the at least one pair of MIPI differential signals, and the second electronic device 73 performs impedance matching and shielded grounding processing on the at least one pair of MIPI differential signals.

Figure 8:
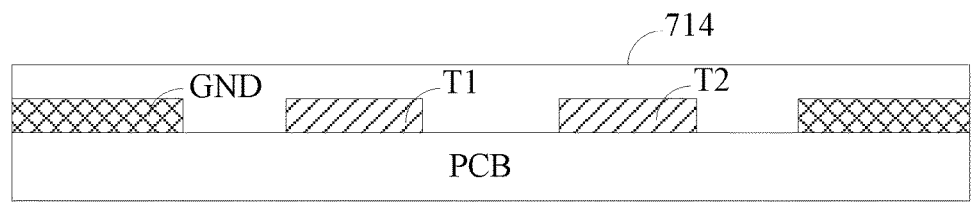
FIG. 8 is a schematic view illustrating a first electronic device in FIG. 7.

As is shown in FIG. 8, lines T1 and T2, which are used for transmission of one pair of MIPI differential signals, are provided on a printed circuit board (PCB) of the first electronic device 71. The lines T1 and T2 are arranged between two ground layers GND. A shielding layer 714 is further provided in the first electronic device 71. The shielding layer 714 is used for covering the lines T1 and T2, and is connected with the ground layers GND, such that the shielded grounding processing is achieved. The first electronic device 71 may control impedance of line T1 and impedance of line T2 to make lines T1 and T2 having same impedance for transmission of MIPI difference signals, such that the impedance matching processing is realized, such as both the impedance of line T1 and impedance of line T2 for transmission of MIPI differential signal is 100 Ohms. Thus impedance matching and shielded grounding processing have been achieved by the first electronic device 71 on at least one pair of MIPI differential signals. The principle that the second electronic device 73 performs impedance matching and shielded grounding processing on the at least one pair of MIPI differential signals is the same with that the first electronic device 71 performs impedance matching and shielded grounding processing on the at least one pair of MIPI differential signals, which will not be described herein.

An interface may respectively be provided at both ends of the data cable 72. Namely an interface is provided at one end of the data cable 72 which is connected to the first electronic device 71, and an interface is provided at the other end of the data cable 72, which is connected to the second electronic device 73. The interface may be a HDMI. In other embodiments, the interface may be other interfaces, such as a Type C interface.

In this embodiment, transmission of four pairs of MIPI differential signals by the data cable 72 is taken as an example to describe more completely. In other embodiments, the data cable 72 may transmit other number of pairs of MIPI differential signals. For instance, the data cable 72 transmits five or six pairs of MIPI differential signals.

The four pairs of MIPI differential signals may be MIPI differential signal D0+ and D0−, MIPI differential signal D1+ and D1−, MIPI differential signal D2+ and D2−, and MIPI differential signal D3+ and D3−. The aforementioned data cable 72 transmits the four pairs of MIPI differential signals, reducing the frequency of each pair of MIPI differential signals. Anti-interference capacity of the MIPI differential signals can be improved due to the reduced frequency thereof. Thus the distance that the data cable 72 transmits the MIPI differential signals can be increased. For example, assuming that the frequency of the MIPI signals is 800 MHz, when four pairs of MIPI differential signals is adopted for transmission, the frequency of each pair of MIPI differential signals is reduced to 200 MHz. Therefore, the number of pairs of MIPI differential signals may be determined according to the length of the data cable and the frequency of the MIPI signals. In general, longer the length of the data cable is and higher the frequency of the MIPI signals is, more pairs of MIPI differential signals can be used.

In one embodiment, the data cable 72 may further receive a power down (PDN) signal from the second electronic device 73, and transfer the PDN signal to the first electronic device 71. The first electronic device 71 may stop working according to the PDN signal.

Alternatively, the data cable 72 may further receive a reset (RST) signal from the second electronic device 73, and transfer the RST signal to the first electronic device 71. The first electronic device 71 resets according to the RST signal.

The first electronic device 71 may determine whether the PDN signal and RST signal is delayed after receiving the PDN signal and RST signal. The first electronic device 71 may tune timings of the PDN signal and RST signal when they are delayed, so as to avoid the delay of the PDN signal and RST signal when long distance transmission by the data cable 72 happens.

Now the working principle of the electronic system 70 in this embodiment is described in details as follows.

As the first electronic device 71 is connected to the second electronic device 73 through the data cable 72, the data cable 72 transmits the power supply provided by the second electronic device 73 to the first electronic device 71. The power supply module 713 of the first electronic device 71 converts the power supply to the working voltage, so as to make the first electronic device 71 work normally.

As the first electronic device 71 works normally, the data cable 72 transmits the I2C and MCLK signals provided by the second electronic device 73 to the first electronic device 71. The first electronic device 71 generates four pairs of MIPI differential signals according to the I2C signal.

The data cable 72 receives the four pairs of MIPI differential signals from the first electronic device 71, and performs impedance matching and shielded grounding processing on the four pairs of MIPI differential signals. Then the data cable 72 transmits the processed four pairs of MIPI differential signals to the second electronic device 73.

When the data cable 72 transmits the PDN signal provided by the second electronic device 73 to the first electronic device 71, the first electronic device 71 stops working.

Since the data cable 72 has performed impedance matching and shielded grounding processing on the four pairs of MIPI differential signals, the length of the data cable 72 can reach more than 1 meter, generally being controlled within 3 meters. That is to say, the length of the data cable 72 is greater than or equal to 1 meter and less than or equal to 3 meters. Of course, the length of the data cable 72 may be less than 1 meter, such as 30 cm, 50 cm or 80 cm. The length of the data cable 72 may also be greater than 3 meters in other embodiment.

The first electronic device 71 may be an electronic product, which may be a mobile phone, vehicle-mounted terminal, tablet computer, computer terminal, or a mainboard thereof. The second electronic device 73 may be a camera or display screen. The first electronic device 71 and second electronic device 73 generally are in a structure with split type instead of an integrated structure.

Compared with the scheme in FIG. 4, the data cable 72 in this embodiment performs impedance matching and shielded grounding processing on the four pairs of MIPI differential signals, such that the length of the data cable 72 can be greater than or equal to 1 meter. Thus the long distance transmission of MIPI signals can be achieved.

Figure 9:
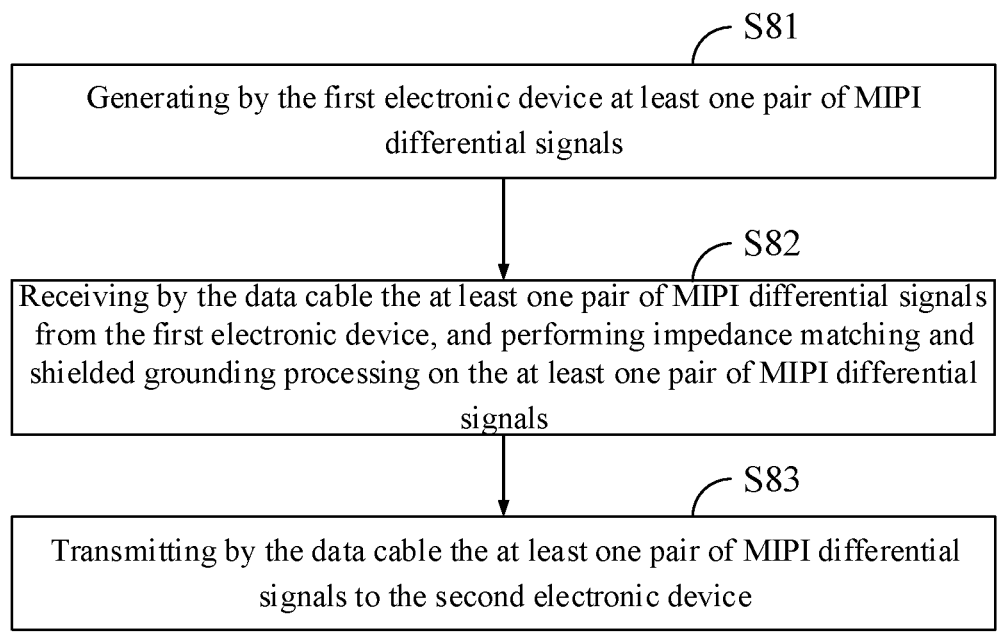
FIG. 9 is a flowchart illustrating an embodiment of a method for transmitting MIPI signals.

An embodiment of a method for transmitting MIPI signals is provided in the present disclosure, which will be described based on the aforementioned electronic system 70. As is shown in FIG. 9, the method may include the following steps.

In step S81: the first electronic device 71 may generate at least one of MIPI differential signals.

Before the step S81, the data cable 72 acquires an indication signal from the second electronic device 73, and transmits the indication signal to the first electronic device 71. For instance, the indication signal may be an I2C signal, which is used to indicate how many pairs of MIPI differential signals adopted by the first electronic device 71 to perform data transmission. In other words, the I2C signal indicates how many pairs of MIPI differential signals adopted by the first electronic device 71 to perform data transmission. In the embodiment of FIG. 7, the data cable 72 supports up to four pairs of MIPI differential signals, then the I2C signal may indicate that the first electronic device 71 can use one, two, three or four pairs of MIPI differential signals for data transmission. For example, when the I2C signal indicates that two pairs of MIPI differential signals are used for data transmission, MIPI differential signals D0+/− and D1+/− may be adopted for data transmission.

The first electronic device 71 determines whether the I2C signal is delayed after receiving the I2C signal. And the first electronic device 71 tunes a timing of the I2C signal, avoiding delay resulting from long distance transmission of the I2C signal via the data cable 72.

In the step S81, the first electronic device 71 generates the at least one of MIPI differential signals according to the I2C signal.

After the step S81, the first electronic device 71 performs impedance matching and shielded grounding processing on the at least one pair of MIPI differential signals. As is shown in FIG. 8, lines T1 and T2, which are used for transmission of one pair of MIPI differential signals, are provided on a printed circuit board (PCB) of the first electronic device 71. The lines T1 and T2 are arranged between two ground layers GND. A shielding layer 714 is further provided in the first electronic device 71. The shielding layer 714 is used for covering the lines T1 and T2, and is connected with the ground layers GND, such that the shielded grounding processing is achieved. The first electronic device 71 may control impedance of line T1 and impedance of line T2 to make lines T1 and T2 having same impedance for transmission of MIPI difference signals, such that the impedance matching processing is realized, such as both the impedance of line T1 and impedance of line T2 for transmission of MIPI differential signal is 100 Ohms. Thus impedance matching and shielded grounding processing have been achieved by the first electronic device 71 on at least one pair of MIPI differential signals.

In step S82: the data cable 72 may receive the at least one pair of MIPI differential signals from the electronic device 71, and perform impedance matching and shielded grounding processing on the at least one pair of MIPI differential signals.

In step S83: the data cable 72 may transmit the at least one pair of MIPI differential signals to the second electronic device 73.

After the step S83, the second electronic device 73 performs impedance matching and shielded grounding processing on the at least one pair of MIPI differential signals.

The path for MIPI differential signals transmission via the data cable 72 is greater than or equal to 1 meter.

With the implementation of the aforementioned embodiment, the data cable 72 receives at least one pair of MIPI differential signals from the electronic device 71, performs impedance matching and shielded grounding processing on the at least one pair of MIPI differential signals, and transmits the at least one pair of MIPI differential signals to the second electronic device 73. In this way, the at least one pair of MIPI differential signals of the first electronic device 71 can be transmitted to the second electronic device 73 via the data cable 71, reducing cost. In addition, the path for MIPI differential signals transmission via the data cable 72 is greater than or equal to 1 meter, in which long distance transmission for MIPI signals is realized.

Figure 10:
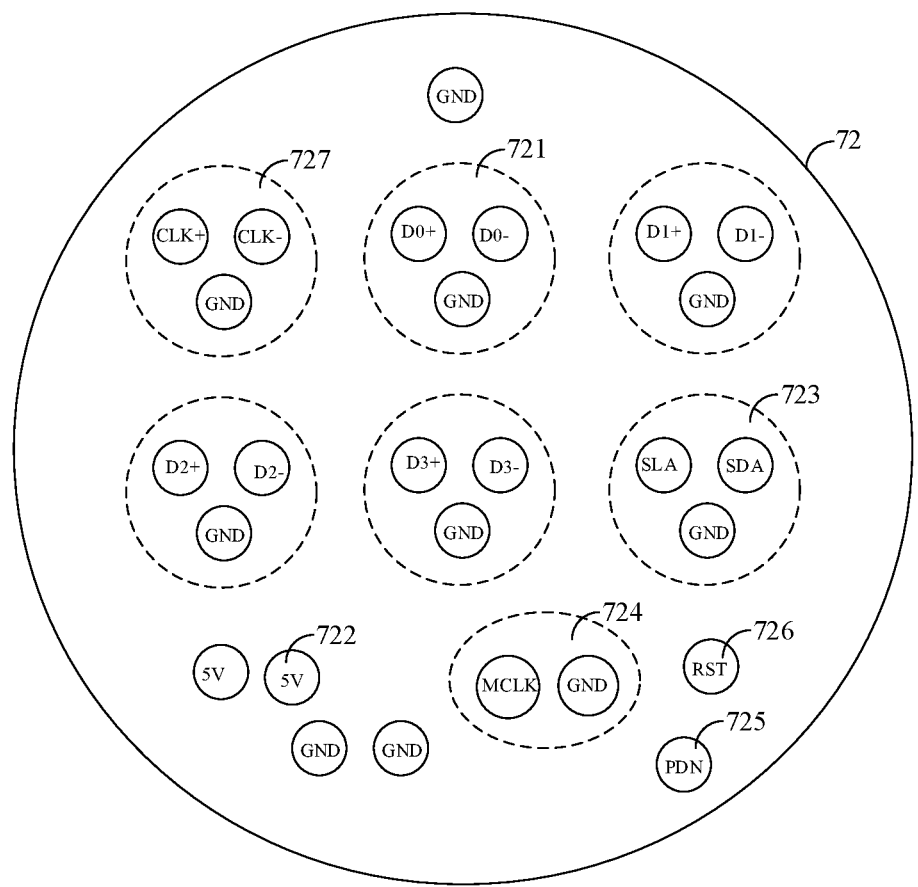
FIG. 10 is a schematic view illustrating an embodiment of a data cable according to the present disclosure.

An embodiment of a data cable is provided in the present disclosure, which will be described based on the aforementioned electronic system 70. As shown in FIG. 10, the data cable 72 may be configured to transmit MIPI signals, including at least one signal transmission path 721. Each signal transmission path 721 may be used for transmitting one pair of MIPI differential signals and performing impedance matching and shielded grounding processing on the one pair of MIPI differential signals.

The at least one signal transmission path 721 is configured to receive MIPI differential signals from the first electronic device 71 and transmit the MIPI differential signals to the second electronic device 73. That is to say, the at least one pair of MIPI differential signals of the first electronic device 71 is transmitted to the second electronic device 73 via the at least one signal transmission path 721.

As the data cable 72 includes a plurality of signal transmission paths 721, each signal transmission path 721 will perform impedance matching and shielded grounding processing on the MIPI signals being transmitted therein. In this way, it can avoid that the MIPI differential signals transmitted in the signal transmission path 721 will be interfered.

The data cable 72 may further include at least one power supply transmission path 722. the power supply transmission path 722 may be configured for transmitting the power supply provided by the second electronic device 73 to the power supply module 713 of the first electronic device 71, such that the power supply module 713 converts the power supply into the working voltage of the first electronic device 71.

In one embodiment, the data cable 72 may include four signal transmission paths 721, which are respectively configured for transmitting four pairs of MIPI differential signals. The four pairs of MIPI differential signals may be MIPI differential signal D0+ and D0−, MIPI differential signal D1+ and D1−, MIPI differential signal D2+ and D2−, and MIPI differential signal D3+ and D3−.

The data cable 72 may further include a transmission path 723 for transmitting the I2C signal, a transmission path 724 for transmitting the MCLK signal, a transmission path 725 for transmitting the PDN (power down) signal, a transmission path 726 for transmitting the RST (reset) signal and a transmission path 727 for transmitting a clock (CLK) signal. The power supply transmission path 722 transmits 5V power supply. The transmission path 723 may include a serial data line (SDA) and a serial clock line (SCL). The transmission path 727 may be configured to transmit a CLK+ signal and a CLK− signal, that is, the transmission path 727 transmits a clock+ signal and a clock− signal.

The data cable may further include interfaces respectively arranged at both ends thereof. The interfaces may be HDMIs. And four signal transmission paths 721 may be arranged in the data cable 72.

The path for MIPI differential signals transmission via the data cable 72 is greater than or equal to 1 meter.

Figure 11:
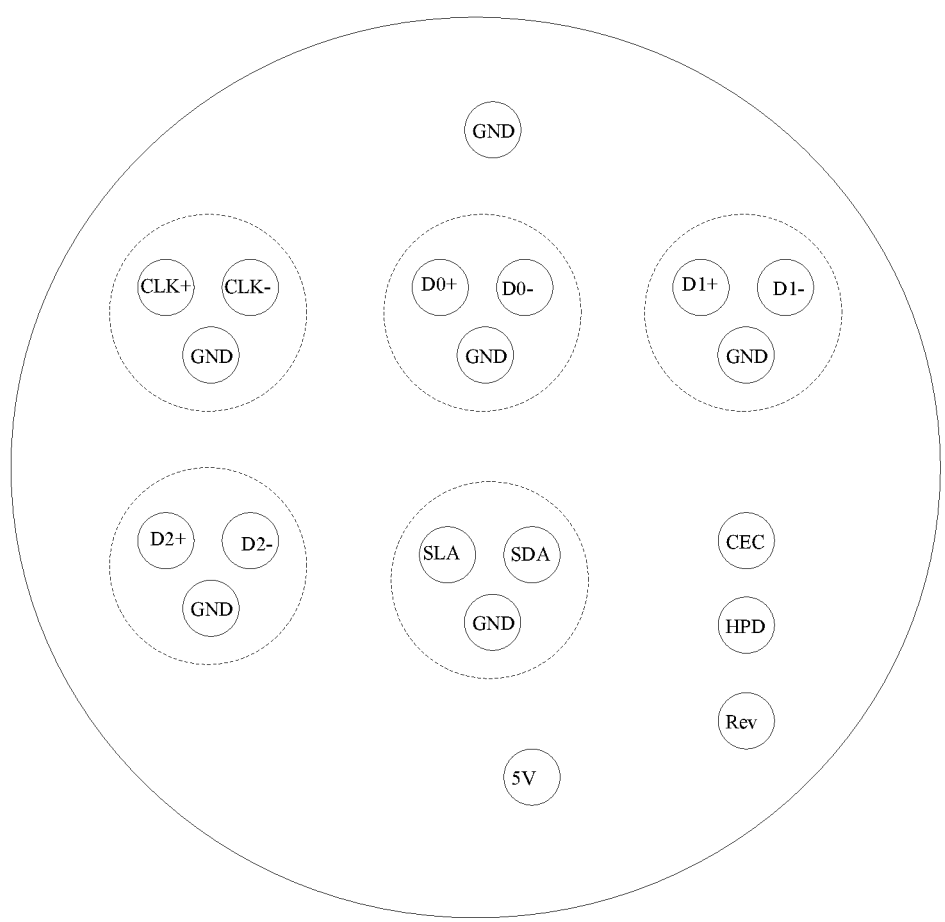
FIG. 11 is a schematic view illustrating a HDMI cable.

Compared with a HDMI cable in FIG. 11 (which illustrates a cross-view of a typical HDMI cable), the data cable in this embodiment may be a HDMI cable, of which transmission paths are only required to be re-arranged without varying interfaces at both ends thereof. Therefore, the interfaces of the data cable in this embodiment may still be HDMIs.

In this embodiment, the data cable receives at least one pair of MIPI differential signals from the first electronic device and performs impedance matching and shielded grounding processing on the at least one pair of MIPI differential signals, and then transmits the processed at least one pair of MIPI differential signals to the second electronic device. That is to say, the at least one pair of MIPI differential signals is transmitted by the first electronic device to the second electronic device via the data cable without an image processor provided in the first electronic device. Thus it can reduce cost. The data cable performs impedance matching and shielded grounding processing on the at least one pair of MIPI differential signals, and the path for transmission of the MIPI differential signals via the data cable is greater than or equal to 1 meter, such that long distance transmission of the least one pair of MIPI differential signals is achieved by the data cable.

Figure 12:
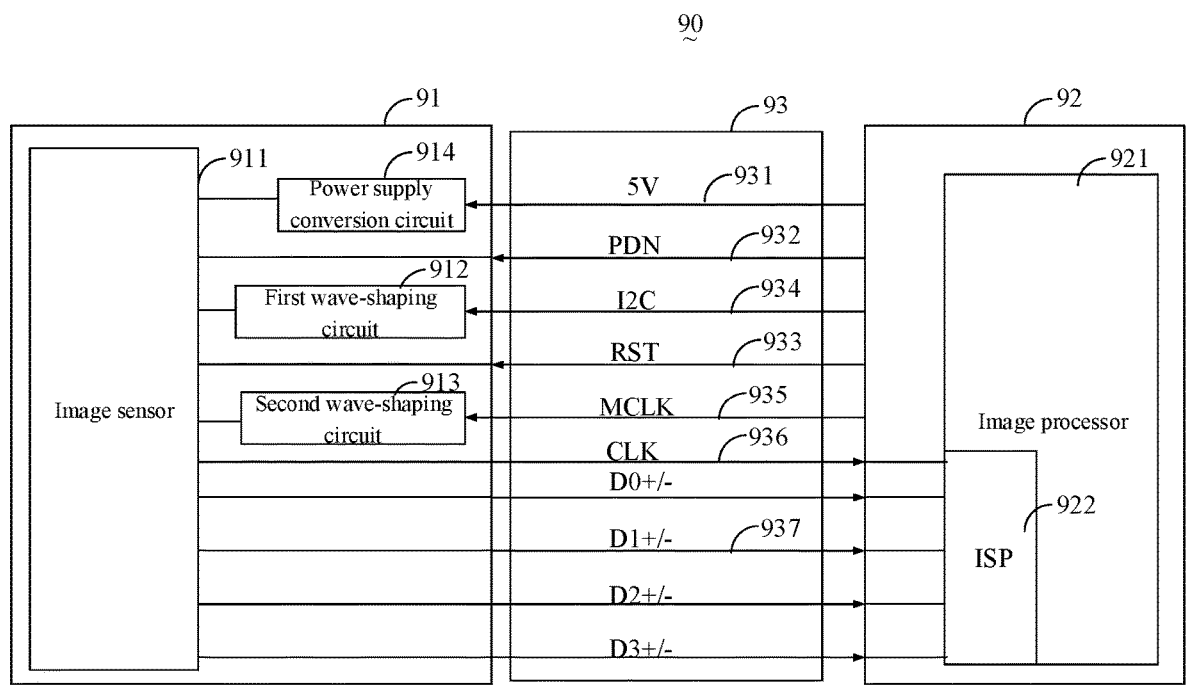
FIG. 12 is a schematic view illustrating another embodiment of an electronic system according to the present disclosure.

Another embodiment of an electronic system is further provided in the present disclosure. As shown in FIG. 12, the electronic system 90 may include a camera 91, a mainboard 92 of a vehicle-mounted terminal and a data cable 93. The camera 91 may include an image sensor 911, a first wave-shaping circuit 912, a second wave-shaping circuit 913 and a power supply conversion circuit 914. The mainboard 92 may include an image processor 921 and an image signal processing (ISP) circuit 922 arranged thereon.

The data cable 93 may include a power supply transmission path 931, a PDN signal transmission path 932, a RST signal transmission path 933, an I2C signal transmission path 934, a MCLK signal transmission path 935, a CLK signal transmission path 936 and four signal transmission paths 937.

The power supply transmission path 931 is configured for transmitting power supply provided by the mainboard 92 to the power supply conversion circuit 914 of the camera 92. The power supply conversion circuit 914 is used for converting the power supply into a working voltage to make the image sensor 911, the first wave-shaping circuit 912 and the second wave-shaping circuit 913 work normally.

The PDN signal transmission path 932 is configured to transmit the PDN signal of the mainboard 92 to the image sensor 911 of the camera 91. The image sensor 911 controls the camera 91 stop working according to the PDN signal. The RST signal transmission path 933 is used for transmitting a RST signal of the mainboard 92 to the image sensor 911 of the camera 91. The image sensor 911 controls the camera 91 reset according to the RST signal. The MCLK signal transmission path 935 is configured to transmit the MCLK signal of the mainboard 92 to the image sensor 911 of the camera 91. The CLK signal transmission path 936 is configured to transmit a clock signal of the camera 91 to the ISP circuit 922 of the mainboard 92.

The I2C signal transmission path 934 is configured to transmit an I2C signal of the mainboard 92 to the first wave-shaping circuit 912 of the camera 91. The first wave-shaping circuit 912 performs wave adjustment on the I2C signal, and transmits the adjusted I2C signal to the image sensor 911. The I2C signal may be configured to indicate that the number of pairs of the at least one pair of MIPI differential signals is four.

The image sensor 911 may be configured for obtaining image information and generating four pairs of MIPI differential signals according to the image information and the I2C signal. The four signal transmission paths 937 respectively transmit the four pairs of MIPI differential signals to the ISP circuit 922. The ISP circuit 922 may be configured to perform image processing on the four pairs of MIPI differential signals.

The length of the data cable 93 may be greater than or equal to 1 meter.

Compared with the schemes in FIGS. 1-3, the camera 91 in this embodiment can transmit the four pairs of MIPI differential signals to the mainboard 92 via the data cable 93, without an image processor arranged in the camera 91. In this way, it can reduce cost. Moreover, the mainboard 92 can perform image processing on the four pairs of MIPI differential signals, reducing load of the mainboard 92.

Figure 13:
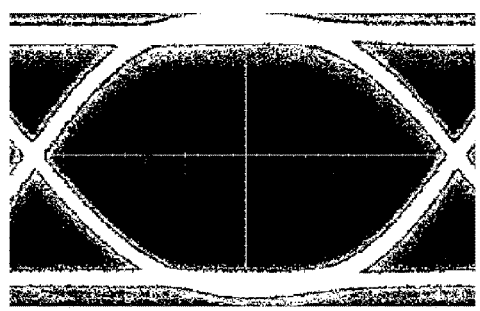
FIG. 13 is a schematic view illustrating waves when an oscilloscope detects a data cable.

The aforementioned data cable with 3 meters has been tested in the laboratory, one end of which is input the four pairs of MIPI differential signals and the other end of which is detected by an oscilloscope. The detection result is shown in FIG. 13, in which a waveform diagram shows a good eye pattern. Therefore, it indicates good quality of signal transmission. Besides, the aforementioned data cable with 2.5 meters has also been tested with two pairs of MIPI differential signals. Similarly, good test result has been obtained. Therefore, long distance transmission of the MIPI signals can be achieved by the data cable in the present disclosure.

According to the embodiments, the subsequent advantages may be achieved: different from that in the prior, in the above-mentioned scheme, the data cable receives at least one pair of MIPI signals from the first electronic device, and then performs impedance matching and shielded grounding processing on the MIPI signals. As the data cable performs impedance matching and shielded grounding processing on the MIPI signals, accuracy can still be ensured when long distance transmission of the MIPI signals is performed. Thus long distance transmission of the MIPI signals can be achieved. And further, the first electronic device can transmit the MIPI signals to the second electronic device via the data cable without converting the MIPI signals into other signals. Therefore, it can reduce cost thereof, such that long distance transmission of the MIPI signals can be achieved with low cost.

The above description depicts merely some exemplary embodiments of the disclosure, but does not mean to limit the scope of the disclosure. Any equivalent structure or flow transformations made to the disclosure, or any direct or indirect applications of the disclosure on other related fields, shall all be covered within the protection of the disclosure.

What is claimed is:

1. An electronic system, comprising:
a first electronic device configured to generate at least one pair of MIPI (Mobile Industry Processor Interface) differential signals;
a HDMI data cable and a second electronic device connected to the first electronic device via the HDMI data cable;
wherein the HDMI data cable comprises at least one signal transmission path for transmitting the at least one pair of MIPI differential signals between the first electronic device and the second electronic device without converting the MIPI differential signals to other signal format, each signal transmission path transmits one pair of MIPI differential signals and performs impedance matching and shielded grounding processing,
Wherein the shielded grounding processing comprises transmitting one pair of MIPI differential signals and a ground signal in one signal transmission path and providing a shielding layer for shielding the one signal transmission path in the HDMI data cable.

2. The electronic system according to claim 1, wherein both the first and second electronic devices are further configured to perform impedance matching and shielded grounding processing on the at least one pair of MIPI differential signals.

3. The electronic system according to claim 2, wherein the HDMI data cable is further configured to receive an indication signal from the second electronic device and transmit the indication signal to the first electronic device, and the first electronic device is configured to generate the at least one pair of MIPI differential signals according to the indication signal which indicates the number of pairs of the at least one pair of MIPI differential signals.

4. The electronic system according to claim 3, wherein the first electronic device comprises a power supply module, configured to convert a power supply into a working voltage of the first electronic device, wherein the power supply is provided by the second electronic device and is transmitted by the HDMI data cable to the power supply module.

5. The electronic system according to claim 1, wherein the at least one pair of MIPI differential signals comprise four pairs of MIPI differential signals.

6. The electronic system according to claim 5, wherein an interface is respectively arranged at both ends of the HDMI data cable, the interface is a High Definition Multimedia Interface (HDMI).

7. The electronic system according to claim 1, wherein the length of the HDMI data cable is greater than or equal to 1 meter.

8. The electronic system according to claim 7, wherein the length of the HDMI data cable is less than or equal to 3 meter.

9. A method for transmitting MIPI (Mobile Industry Processor Interface) signal, the method comprises:
receiving by a HDMI data cable at least one pair of MIPI differential signals, wherein the HDMI data cable comprises at least one signal transmission path for transmitting the at least one pair of MIPI differential signals,
performing impedance matching and shielded grounding processing on the at least one pair of MIPI differential signals; and
transmitting by the HDMI data cable the at least one pair of MIPI differential signals without converting the MIPI differential signals to other signal format,
Wherein the shielded grounding processing comprises transmitting one pair of MIPI differential signals and a ground signal in one signal transmission path and providing a shielding layer for shielding the one signal transmission path in the data cable.

10. The method according to claim 9, further comprising:
performing by the first electronic device impedance matching and shielded grounding processing on the at least one pair of MIPI differential signals.

11. The method according to claim 9, further comprising:
performing by the second electronic device impedance matching and shielded grounding processing on the at least one pair of MIPI differential signals.

12. The method according to claim 9, the method further comprising:

receiving by the HDMI data cable an indication signal from the second electronic device and transmitting the indication signal to the first electronic device, wherein the indication signal is configured to indicate the number of pairs of the at least one pair of MIPI differential signals.

13. The method according to claim 9, wherein the at least one pair of MIPI differential signals comprise four pairs of MIPI differential signals.

14. The method according to claim 9, wherein a path for transmitting the MIPI differential signals through the HDMI data cable is greater than or equal to 1 meter.

15. The method according to claim 9, wherein a path for transmitting the MIPI differential signals through the HDMI data cable is greater than or equal to 1 meter, and less than or equal to 3 meters.

16. An electronic system, comprising:

a first electronic device configured to generate at least one pair of MIPI (Mobile Industry Processor Interface) differential signals;

a data cable and a second electronic device connected to the first electronic device via the data cable;

wherein the data cable comprises at least one signal transmission path for transmitting the at least one pair of MIPI differential signals between the first electronic device and the second electronic device without converting the MIPI differential signals to other signal format, each signal transmission path transmits one pair of MIPI differential signals and performs impedance matching and shielded grounding processing, Wherein the shielded grounding processing comprises transmitting one pair of MIPI differential signals and a ground signal in one signal transmission path and providing a shielding layer for shielding the one signal transmission path in the data cable, wherein the length of the data cable is greater than or equal to 1 meter.

* * * * *